United States Patent [19]
Camiciottoli et al.

[11] 3,770,913

[45] Nov. 6, 1973

[54] SYSTEM FOR REMOTE SUPERVISION OF TWO-WAY REPEATER STATIONS IN MULTICHANNEL PCM TELECOMMUNICATION PATH

[75] Inventors: Roberto Camiciottoli, Milan; Dino Marchini, Trezzano Sul Naviglio, both of Italy

[73] Assignee: Societa Italiana Telecommunicazioni Siemens s.p.a., Milano, Italy

[22] Filed: Jan. 31, 1972

[21] Appl. No.: 222,144

[30] Foreign Application Priority Data

Jan. 29, 1971 Italy .............................. 19899 A/71

[52] U.S. Cl. ........................................ 179/175.31 R

[51] Int. Cl. ............................................. H04b 3/46

[58] Field of Search ................ 179/175.31 R, 175.3; 324/52

[56] References Cited

UNITED STATES PATENTS

| | | | |
|---|---|---|---|
| 3,651,284 | 3/1972 | Maione | 179/175.31 R |
| 3,649,777 | 3/1972 | Matsushima | 179/175.31 R |
| 3,692,964 | 9/1972 | Camiciottoli et al. | 179/175.31 R |
| 3,586,968 | 6/1971 | Barjot | 179/175.31 R |

FOREIGN PATENTS OR APPLICATIONS

| | | | |
|---|---|---|---|
| 1,068,890 | 5/1967 | Great Britain | 179/175.31 R |

*Primary Examiner*—Kathleen H. Claffy
*Assistant Examiner*—Douglas W. Olms
*Attorney*—Karl F. Ross

[57] ABSTRACT

A multichannel PCM telecommunication path, extending between two terminal stations, comprises a d-c service line common to *m* parallel channels which are divided into two groups for transmission in opposite directions. A plurality of cascaded repeating stations, with m repeaters each, are inserted in that path and are each provided with a single band-pass filter designed to pass a test frequency individual to any repeating station. The test frequency is established by an unbalanced interrogation code which is iteratively transmitted over a given channel from a control post at one terminal over an outgoing channel and returned thereto over an incoming channel in a loop closed at the other terminal in response to the code. The filtered-out test frequency can be fed to the control post via the service line from the outputs of the two repeaters in the closed loop by way of two transformers and respective diodes which are inversely biased by a d-c potential on the service line, the polarity of this potential being reversible at the control post to select either of these repeaters for testing.

10 Claims, 4 Drawing Figures

SYSTEM FOR REMOTE SUPERVISION OF TWO-WAY REPEATER STATIONS IN MULTICHANNEL PCM TELECOMMUNICATION PATH

Our present case relates to a system for the remote supervision of two-way repeater stations inserted between two terminal stations in a signal path designed for pulse-code modulation (PCM).

In commonly owned copending application Ser. No. 198,788, filed Nov. 15, 1971 by Roberto Camiciottoli and Giuseppe Grossi, there has been disclosed a system of this general type with $n$ repeating stations between the two terminals, each station including $m$ repeaters serving as many PCM channels. The channels and the associated repeaters are divided into two groups for the transmission of messages in one direction or the other, i.e., for outgoing and incoming traffic as seen from one of the terminals. A common service line, such as a two-way circuit, extends from a control unit at that one terminal to all the repeaters for the purpose of sending out an interrogation code in the form of a predetermined pulse pattern, individual to a selected repeating station, and returning to that unit a response signal indicating the proper performance of all the repeaters of that station.

In another commonly owned copending application, Ser. No. 99,855 filed Dec. 21, 1970 by Roberto Camiciottoli and Maurizio Palombari, now U.S. Pat. No. 3,692,964, means have been disclosed for closing at any addressed repeating station a loop circuit between an incoming and an outgoing signal path for the purpose of simultaneous testing, with the aid of a recurrent code combination, of all the repeaters cascaded in both the outgoing and the incoming branch of the loop up to and including those of the addressed station. Thus, the system of the last-mentioned application provides for concurrent checking of some or all of the repeaters in a pair of conjugate channels whereas the system of the first-mentioned application jointly tests the repeaters of all the channels at a selected station.

The general object of our present invention is to provide, in a PCM telecommunication system of the general type referred to, means for individually addressing any repeater in order to test its performance.

A more specific object is to provide simple circuitry, including a single response detector for all the repeaters of a station, to carry out this task.

These objects are realized, in accordance with our present invention, by the provision of a test-code generator forming part of a control post at one of the two terminal stations, this generator being selectively connectable to any channel in the group of m/2 outgoing channels, with monitoring circuitry at the other, remote terminal which recognizes the test code in the affected channel and closes a loop through the conjugate channel in the other group of m/2 channels whereby the test code successively traverses, at each repeating station, a first repeater serving the outgoing channel and a second repeater serving the associated incoming channel. A detector at the repeating station addressed by the chosen code is selectively connectable, in response to switchover signals transmitted over the service line from the control post, to one or the other of these repeaters so as to send back its response signal to the control post by way of that service line.

More specifically, the switchover means controlled via the service line may comprise a pair of relatively inverted electronic gates, advantageously two oppositely poled diodes, which are alternately blocked and unblocked by a biasing potential of one or the other polarity.

According to another more specific feature of our invention, the common detector at each repeating station is a band-pass filter designed to extract a low-frequency component from the output of any repeater receiving that code. Such a test code may be of a type disclosed in commonly owned copending application Ser. No. 212,283, filed Dec. 27, 1971 by one of us (Dino Marchini), which is a recurrent combination of a balanced pulse pattern $y$ and an unbalanced pulse pattern $z$ of approximately the same length.

Pattern $y$ consists of one or more pairs of closely spaced pulses of opposite polarity so that its integrated value is 0; pattern $z$ is derived from pattern $y$ by suppression or introduction of one or more pulses of a single polarity so that its integrated value is of finite magnitude. The alternation of these two patterns is a recurrent pulse sequence with a fundamental frequency whose period equals the combined length of pulse series $y$ and $z$. Thus, the test frequency may be varied by increasing or decreasing the length of either or both patterns.

It is therefore merely necessary to provide each repeater with an output circuit including a low-pass filter which suppresses the high-frequency components of the test code and feeds a band-pass filter serving as the response detector. If the repeater operates properly, the assigned low-frequency component has a substantial amplitude; in the event of a malfunction, the distinction between the two alternating patterns $y$ and $z$ becomes blurred and the output of the band-pass filter decreases or disappears.

By thus assigning only one distinctive test frequency to all the repeaters of a given repeating station, we require only $n$ such frequencies (or possibly $n+1$ if the remote terminal also includes repeating equipment to be tested) so that the several frequencies can be relatively widely spaced and the design of the filters is less exacting.

The above and other features of our invention will be described in detail hereinafter with reference to the accompanying drawing in which.

Figure 1:
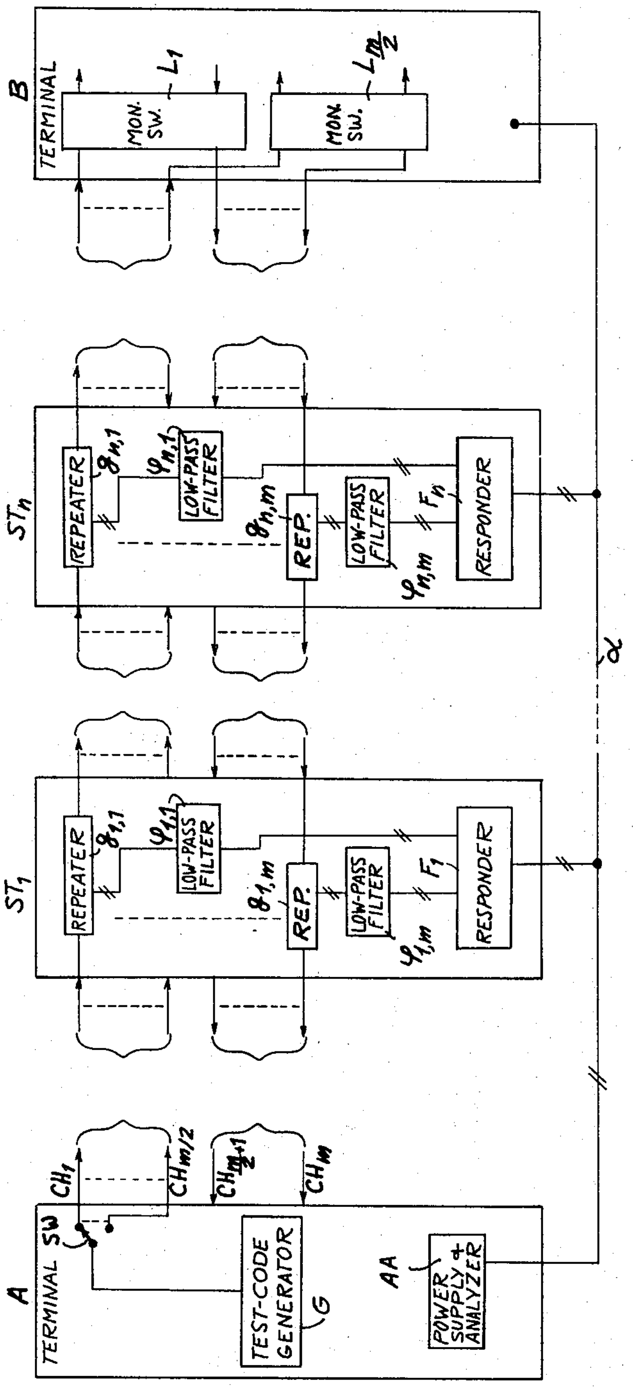
FIG. 1 is an overall block diagram of a supervisory system embodying our invention.

FIG. 1, which is similar to the corresponding Figure of application Ser. No. 198,788, shows part of a transmission path which extends between two terminal sections A and B and which includes a number of cascaded repeating stations $ST_1 - ST_n$. These repeating stations, generally designated $ST_j$ in FIG. 3 and more fully described hereinafter, are all of identical construction and include each a plurality of repeaters $g_{1,1} \ldots g_{1,m}$ through $g_{n,1} \ldots g_{n,m}$. These repeaters serve $m/2$ outgoing channels $CH_1 \ldots CH_{m/2}$, transmitting from terminal A to terminal B, and $m/2$ incoming channels $CH_{m/2+1} \ldots CH_m$, transmitting in the opposite direction. Each repeater is provided with an output circuit which has been more fully illustrated in FIG. 3 and, as shown in FIG. 1, includes an individual low-pass filter $\phi_{1,1} \ldots \phi_{1,m}$ (at station $ST_1$) and $\phi_{n,1} \ldots \phi_{n,m}$ (at station $ST_n$). All the repeaters of a station work, through these filters, into a common responder $F_1 \ldots F_n$ whose output is transmitted to terminal A, referred to hereinafter as the control terminal, by a two-wire service line $\alpha$. This service line ends, within terminal A, at a power-supply and analyzer unit AA which forms part of a control post also including a test-code generator G. The latter may be selectively connected, by means of a switch SW, to any one of the $m/2$ outgoing channels $CH_1 - CH_{m/2}$ which at that point is to be disconnected from its source of PCM message signals normally transmitted thereover.

Figure 2:
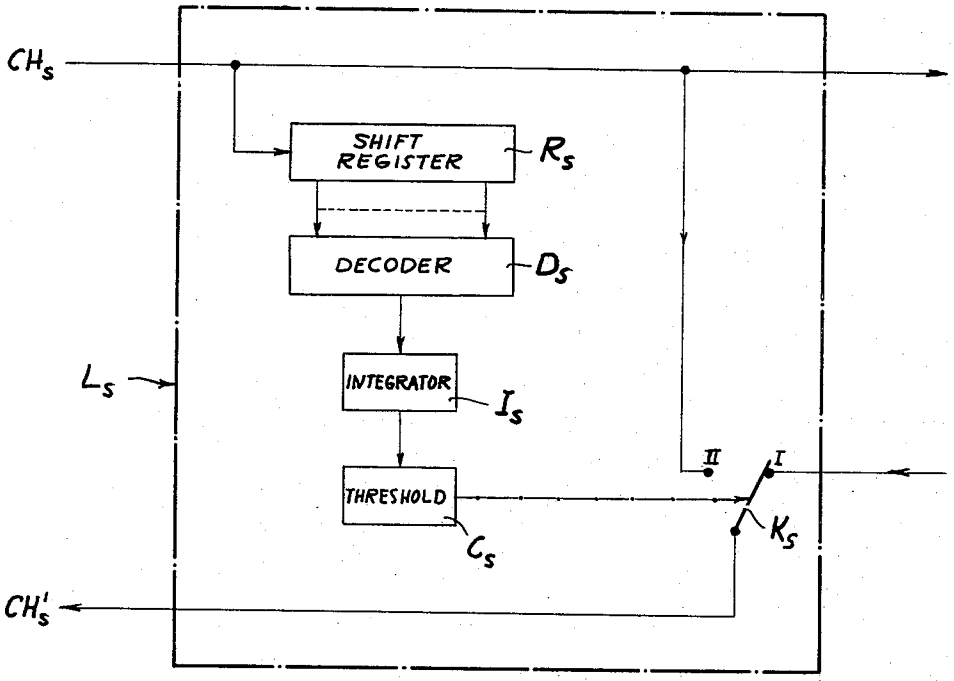
FIG. 2 is a more detailed diagram of monitoring circuitry included in the remote (right-hand) terminal of the system of FIG. 1.

At the remote terminal B, a set of monitoring circuits $L_1 \ldots L_{m/2}$ are respectively coupled (e.g., inductively) to the transmitting channels $CH_1 - CH_{m/2}$ and include switches for individually connecting these channels in a loop to their couterparts in the receiving group $CH_{m/2+1} \ldots CH_m$; this loop may include a final repeater for each direction of traffic working into the service line $\alpha$ through an associated responder in the same manner as the corresponding repeaters of stations $ST_1 - ST_n$. A generic monitoring unit $L_g$, illustrated in FIG.2, comprises a shift register $R_g$ connected to the associated transmission channel $CH_g$ in a branch circuit whose presence does not interfere with the normal transmission of message signals to a destination beyond terminal B. Shift register $R_g$ works into a decoder $D_g$, such as an AND gate with partly inverting inputs connected to the several stage outputs of the register, which energizes an integrator $I_g$ whenever a pulse combination or code word temporarily stored in that register has a predetermined configuration. The integrator, which may be a simple RC circuit with a large time constant as compared with the period of any of the test frequencies employed, feeds a threshold circuit $C_g$ which reverses an electronic switch $K_g$ as soon as the output voltage of the integrator $I_g$ reaches a predetermined level. This arrangement prevents any switching operation in response to an isolated pulse combination duplicating a test code but forming part of a message transmitted over channel $CH_g$.

Such a test code need not be of the aforedescribed bipolar type, as disclosed in the copending Marchini application, but could also consist of an alternation of simple binary words so long as the cumulative values of their bits are mutually different. Thus, for example, the test code transmitted by generator G over channel $CH_g$ may comprise a first word 10100000 (cumulative value 2), transmitted over a period of 250 $\mu$s, and a second word 10000000 (cumulative value 1), transmitted over a like period; the total length of the recurrent test word, equaling 500 $\mu$s, thus corresponds to a test frequency of 2000 Hz.

Suppose that, in the example given, the decoder $D_g$ is connected to detect the bit combination 0010100. This combination occurs not only in the unsymmetrical word pair specified above but also in various expansions and contractions thereof which may be generated to provide test frequencies lower or higher than 2000 Hz. Thus, any periodic recurrence of such an interrogation pattern will trigger the threshold sensor $C_g$ into reversing the switch $K_g$ from its normal position I to its test position II in which the receiving channel $CH'_g$ is cut off from its source of message signals beyond terminal B and is connected instead to channel $CH_g$ to form a loop.

In general, the test code should be a pulse combination not normally used for prolonged periods in the message-transmitting condition of the system, e.g., to indicate an idle channel or an overload situation. It is also possible to protect the monitoring circuits from accidentally responding to fortuitous pulse combinations by inhibiting the reversal of switch $K_g$ as long as terminal B receives a periodic synchronizing signal from terminal A as will be the case only during message transmission but not during testing.

Figure 3:
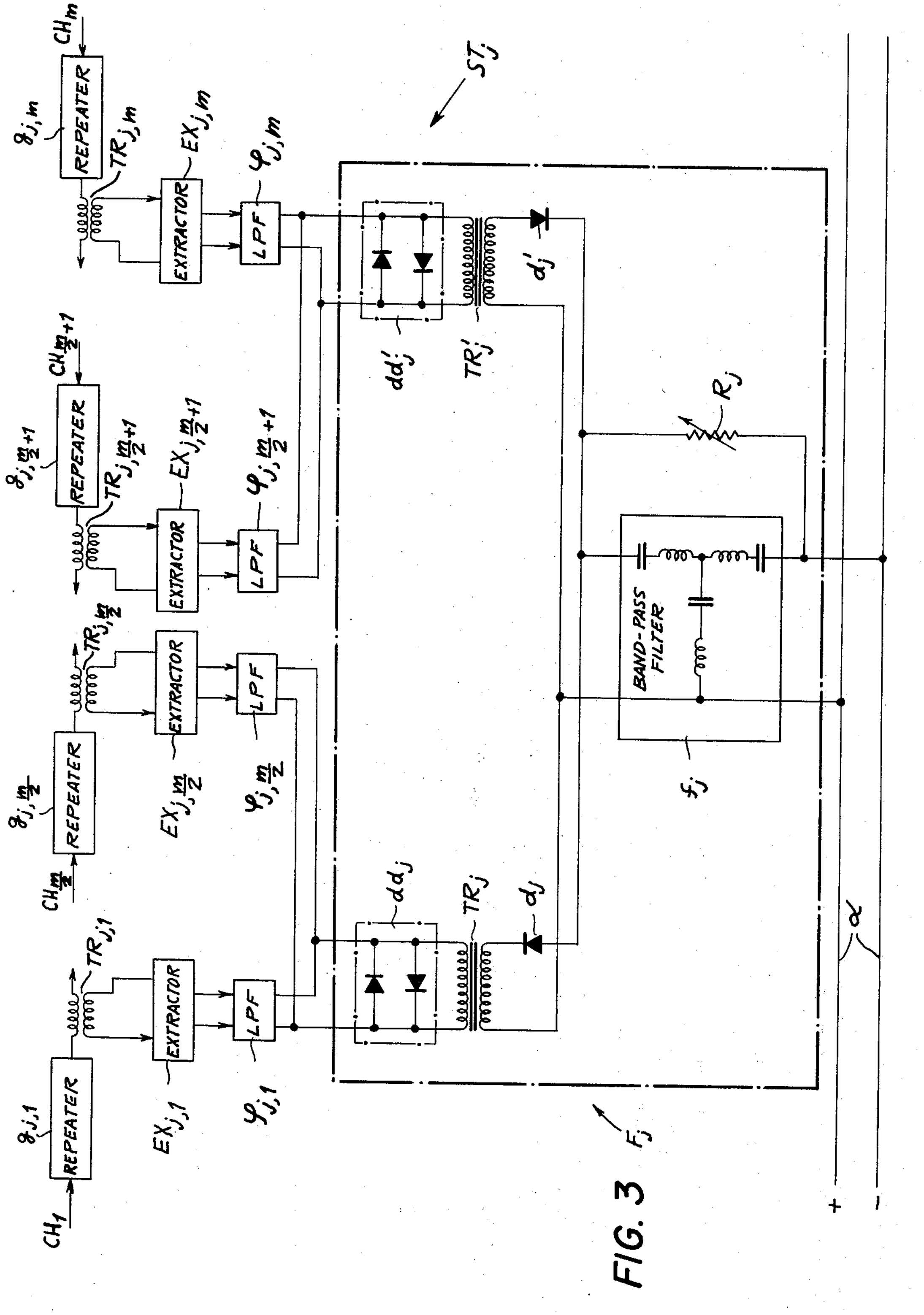
FIG. 3 is a more detailed circuit diagram of a repeating station included in the system of FIG. 1.

Reference will now be made to FIG. 3 which shows the generic repeating station $ST_j$ with repeaters $g_{j,1} \ldots g_{j,m/2}$ for the outgoing channels $CH_1 \ldots CH_{m/2}$ and repeaters $g_{j,m/2+1} \ldots g_{j,m}$ for the incoming channels $CH_{m/2+1} \ldots CH_m$. The output of each repeater feeds, through a transformer $TR_{j,1} \ldots TR_{j,m/2}, TR_{j,m,/2+1} \ldots TR_{j,m}$, an extractor $EX_{j,1} \ldots EX_{j,m/2}, EX_{j,m/2+1} \ldots EX_{j,m}$ comprising an integrating circuit which accumulates a charge varying in the rhythm of the low-frequency component of the test code if the repeater operates properly. This component is stripped by the two low-pass filters in the closed test loop of the accompanying higher pulse frequencies and is then fed to the responder $F_j$ common to all the repeaters of this station. Responder $F_j$ includes a pair of transformers $TR_j$, $TR'_j$ working into a band-pass filter $f_j$ which is tuned to the test frequency assigned to station $ST_j$. The primary of transformer $TR_j$ is connected across the outputs of all the filters $\phi_{j,1} \ldots \phi_{j,m/2}$ in parallel; similarly, the primary of transformer $TR'_j$ is connected across the outputs of the low-pass filters $\phi_{j,m/2+1} \ldots \phi_{j,m}$. These primaries are shunted by respective diode pairs $dd_j$, $dd'_j$ serving as amplitude limiters for the signals clearing the low-pass filters.

The secondaries of transformers $TR_j$ and $TR'_j$ are connected across the two wires of line $\alpha$ by way of filter $f_j$ in series with two relatively inverted diodes $d_j$, $d'_j$ acting as electronic switching gates; a bypass path for filter $f_j$ includes an adjustable resistor $R_j$ whose magnitude decreases from station to station with increasing distance from control terminal A so as to compensate for the progressive reduction of a d-c biasing potential applied to line $\alpha$ by unit AA at that terminal. The magnitude of this biasing potential is such as to block one of the two switching diodes $d_j$, $d_j$, specifically the diode $d'_j$ with the polarity indicated in FIG. 3, against passage of the filter signals whose amplitude is limited by the diode pairs $dd_j$, $dd'_j$. Thus, in the switching state established by the indicated biasing potential, filter $f_j$ receives only the output of transformer $TR'_j$ and, in the presence of a test frequency within its pass-band, clears that frequency for transmission via line $\alpha$ to analyzer AA. If the polarity of the biasing potential on line $\alpha$ is reversed, transformer $TR_j$ will be similarly effective. Thus, depending upon that polarity, either the repeater in the outgoing branch or the repeater in the incoming branch of the closed loop (channels $CH_g$, $CH'_g$) will provide a responsive signal testing its efficiency.

Figure 4:
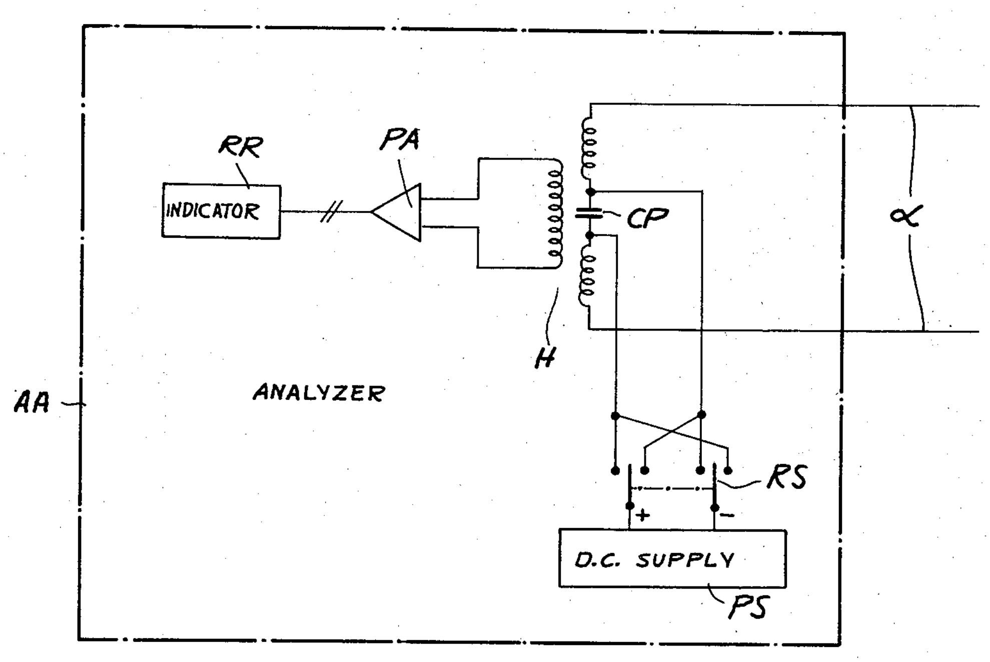
FIG. 4 shows part of a control post in the proximal (left-hand) terminal of the system of FIG. 1.

At the proximal terminal A, as shown in FIG. 4, line $\alpha$ is connected across a hybrid coil H whose secondary works through a power amplifier PA into an indicator RR which registers the proper or the improper performance of the repeater under test, according to the amplitude of the test frequency sent back over the line. The biasing potential is obtained from a d-c power supply PS (shown as a battery) connected across a capacitor CP in hybrid coil H by way of a reversing switch RS which can be manually operated to test either an outgoing repeater or an incoming repeater in a loop circuit energized by generator G via selector switch SW (FIG. 1). Device RR may trigger an alarm upon ascertaining the inefficiency of the repeater under test.

We claim:

1. A system for the individual testing of n sets of repeaters at respective repeating stations, including two groups of repeaters at each station respectively serving *m*/2 outgoing channels and *m*/2 incoming channels of a PCM signal path extending from a control terminal by way of said repeaters to a remote terminal, comprising:

a service line common to said channels extending from said control terminal along said path to all said repeating stations;

a generator of recurrent test codes individually assigned to each of said stations at said control terminal;

selector means at said control terminal for connecting said generator to any of said outgoing channels;

monitoring means at said remote terminal responsive to the arrival of a test code over any one of said outgoing channels for connecting same in a loop to an associated incoming channel whereby the test code successively traverses a first repeater at each of said stations serving the outgoing channel and a second repeater at each of said stations serving the incoming channel;

detector means at each of said stations connected between the outputs of all the repeaters thereof and said service line for ascertaining the appearance of the assigned test code and converting same into a response signal transmitted to said control terminal via said service line;

indicator means for said response signal connected to said service line at said control terminal; and switchover means at each repeating station inserted between said detector means and the two groups of *m*/2 repeaters thereof, said switchover means being operable from said control terminal via said service line for selectively connecting either of said groups to said detector means to the exclusion of the other group.

2. A system as defined in claim 1 wherein said switchover means comprises a pair of relatively inverted electronic gates.

3. A system as defined in claim 2 wherein said gates are a pair of oppositely poled diodes, said control terminal being provided with biasing means selectively operable to apply a blocking potential for either of said diodes to said service line.

4. A system as defined in claim 1 wherein said detector means comprises a band-pass filter tuned to a low-frequency component of the assigned test code.

5. A system as defined in claim 4 wherein each repeater is provided with an output circuit including a low-pass filter for said component connected in tandem with said band-pass filter.

6. A system as defined in claim 5 wherein said band-pass filter is provided with two input transformers connected in parallel to the output circuits of the repeaters of said groups, respectively.

7. A system as defined in claim 6 wherein said switchover means comprises a pair of relatively inverted diodes inserted between said transformers and said band-pass filter.

8. A system as defined in claim 7 wherein said service line has two conductors and each of said stations includes a common biasing circuit for said diodes connected across said conductors, said control station being provided with a source of reversible biasing potential connectable across said conductors.

9. A system as defined in claim 8 wherein said biasing circuit bypasses said band-pass filter.

10. A system as defined in claim 9 wherein said biasing circuit includes an adjustable resistor in parallel with said band-pass filter.

* * * * *